A. DURR.
DRINKING TROUGH.
APPLICATION FILED JAN. 26, 1909.
933,635.
Patented Sept. 7, 1909.
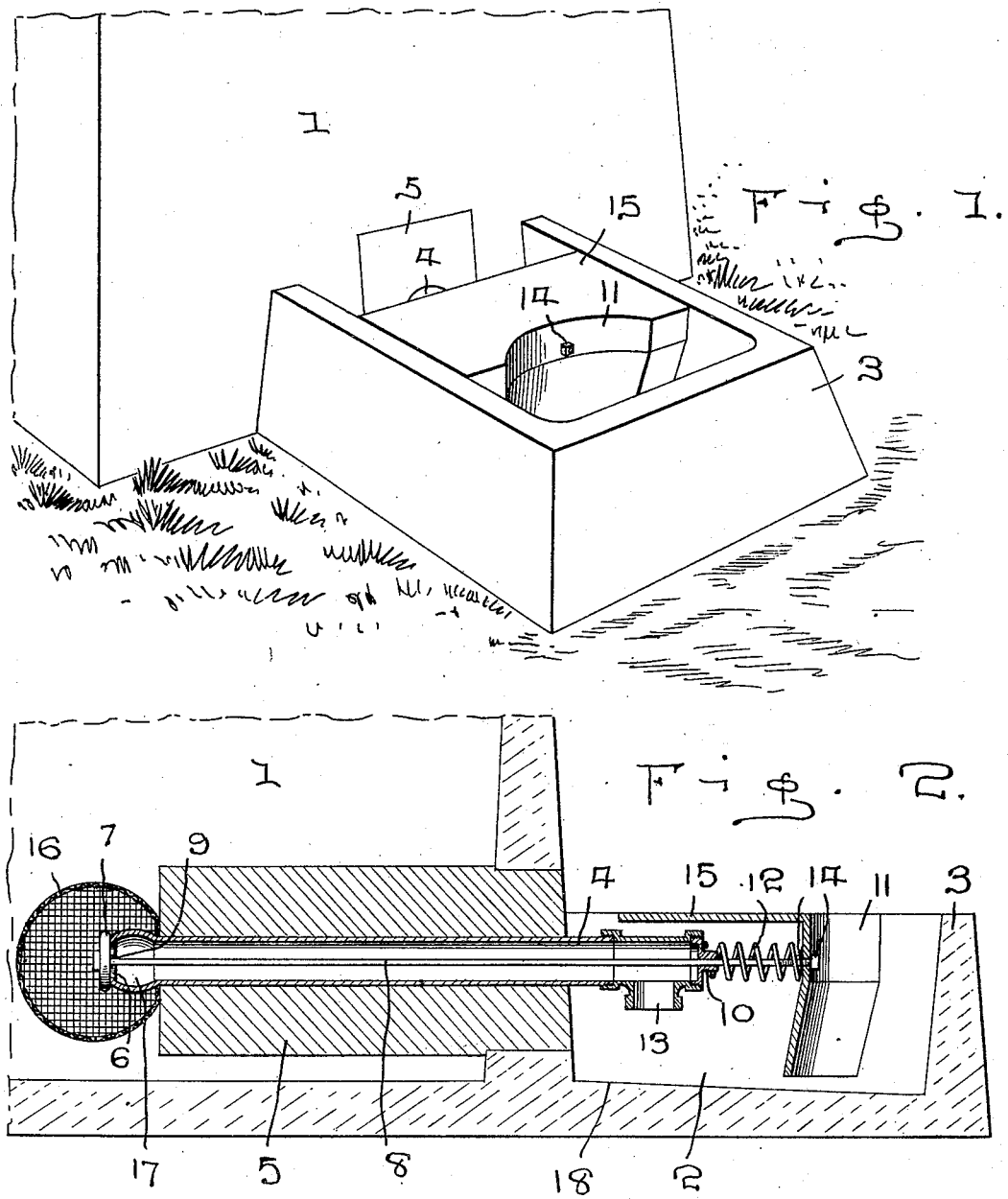
WITNESSES:
INVENTOR
A. Durr
BY
W. J. FitzGerald & Co.
Attorneys

UNITED STATES PATENT OFFICE.

ANDREW DURR, OF SHELBY, IOWA.

DRINKING-TROUGH.

933,635.  Specification of Letters Patent.  Patented Sept. 7, 1909.

Application filed January 26, 1909. Serial No. 474,206.

*To all whom it may concern:*

Be it known that I, ANDREW DURR, a citizen of the United States, residing at Shelby, in the county of Shelby and State of Iowa, have invented certain new and useful Improvements in Drinking-Troughs; and I do hereby declare the following to be a full, clear, and exact description of the invention, such as will enable others skilled in the art to which it appertains to make and use the same.

My invention relates to new and useful improvements in drinking troughs and more particularly to that class adapted to be connected to storage tanks or the like, and my object is to provide means whereby live stock in their efforts to obtain a drink, will operate a valve to permit water to enter the trough.

A further object is to provide means for automatically stopping the flow of the water from the tank and a still further object is to provide a screen for the valve portion of the device.

Other objects and advantages will be hereinafter referred to and more particularly pointed out in the claims.

In the accompanying drawings forming part of this application, Figure 1 is a perspective view of a portion of the tank showing my improved drinking trough attached thereto, and, Fig. 2 is a longitudinal sectional view through the trough and portions of the tank to which the same is attached.

Referring to the drawings in which similar reference numerals designate corresponding parts throughout the several views, 1 indicates a tank, which may be constructed in any preferred manner and of any desired material, but preferably of cement, said tank being adapted to hold a large quantity of water, while 2 indicates a drinking trough, which is preferably formed integral with the tank, the outer faces of the walls of the tank being preferably inclined outwardly from their upper edges, thereby preventing animals from directing the weight of their bodies against said walls.

Communicating at one end with the tank 1 and at its opposite end with the trough 2, is a discharge pipe 4, that portion of the pipe entering the tank 1 being preferably entered through a block 5, which block is adapted to afford a rigid support for the pipe and prevent leakage therearound and through the opening in the wall of the tank 1, the extreme inner end of the pipe 4 passing beyond the block 5 and having a valve seat 6 formed thereon. Adapted to coöperate with the valve seat 6 is a valve 7, which is preferably formed of rubber and when in engagement with its seat, prevents flow of water through the discharge pipe, said valve being carried on a rod 8, one end of the rod extending through a bearing 9 formed on the valve seat 6, while the opposite end thereof extends through a stuffing box 10 at the outer end of the discharge pipe 4, said rod extending a distance beyond the stuffing box and through a shield 11. That portion of the rod between the stuffing box 10 and shield 11 is surrounded by a spring 12, the tension of which is sufficient to normally hold the valve 7 on its seat 6, but when pressure is directed against the shield 11, the spring 12 will be compressed and the valve moved away from its seat, thereby permitting water to readily flow through the discharge pipe 4, a T-coupling 13 being provided at the outer end of the discharge pipe through the depending opening of which the water passes into the trough. The shield 11 is held in position on the rod 8 by means of nuts 14, said shield being concave between its ends and that portion thereof below the rod, inclined rearwardly, so that an animal in its endeavor to obtain the water, will press its nose against the inclined portion and move the shield rearwardly, thereby causing the valve to open and the water to flow into the trough. Extending rearwardly from the upper edge of the shield 11, is a guard plate 15, which prevents the animal from gaining access to the rear portion of the trough, thus causing the animal to pass to the forward end of the trough in order to obtain a drink.

To prevent foreign objects from coming into engagement with the valve 7, I provide a screen 16, which is preferably constructed of meshed wire and surrounds that portion of the discharge pipe 4 extending beyond the inner end of the block 5, the screen being held in position on the pipe in any preferred manner, as by bulging a portion of the pipe as shown at 17.

The prime object of my invention is to prevent the discharge of more water in the drinking trough than is consumed by the animal and by providing the floor 18 of the trough with an inclination toward the forward end of the trough, thereby collecting the water at a point between the shield and the forward edge of the trough, the animal will drink the water remaining in the trough before directing pressure against the shield to obtain more water, in which event, should there be a sufficient quantity of water in the trough to satisfy the animal, the valve will not be necessarily operated to discharge more of the water. If, however, on the other hand, there is no water in the trough, or not a sufficient amount to quench the thirst of the animal, said animal will necessarily press against the shield and thereby discharge a quantity of water into the trough.

It will thus be seen that I have provided a cheap and economical means for delivering water into the trough in small quantities, the operation of the delivering parts being controlled by the desire of the animal to obtain a drink and it will further be seen that in view of the simplicity of the device, it may be readily and cheaply installed and at the same time provide a strong and durable construction.

What I claim is:

1. A stock watering device of the class described, comprising the combination with a tank; of a trough, a discharge pipe entering said tank from the trough, a valve at the inner end of said pipe, a rod carrying said valve and extending beyond the outer end of the pipe, a shield fitting in the trough and having a horizontally extending guard plate at its upper end, means to secure the shield on the rod and a spring surrounding that portion of the rod between the discharge pipe and shield, whereby pressure will be directed on the shield and the valve normally held in a closed position.

2. A stock watering device of the class described, comprising the combination with a tank; of a trough, a discharge pipe extending from the trough into said tank, a valve at the inner end of the pipe, a rod carrying said valve and extending beyond the forward end of the pipe, a screen surrounding said valve and end of the pipe, a shield at the forward end of the rod having a horizontally disposed plate at its upper end and having its central portion concave, a spring surrounding the rod between the discharge pipe and the shield and means to hold the shield in a fixed position on the rod.

3. A stock watering device of the class described, comprising the combination with a tank having a block therein; of a trough having an inclined floor, a discharge pipe extending through said block and having a seat at its inner end and a discharge member at its outer end, a valve adapted to rest on said seat, a valve rod supporting said valve and extending through said pipe, a shield carried by the forward end of said rod, said shield having its central portion concave and the lower portion thereof inclined, a guard plate extending from the upper edge of the shield and means between the pipe and shield to normally hold the valve against its seat.

In testimony whereof I have signed my name to this specification in the presence of two subscribing witnesses.

ANDREW DURR.

Witnesses:
A. L. GIFFORD,
G. H. RINK.